United States Patent
Makke

(10) Patent No.: US 9,790,993 B1
(45) Date of Patent: Oct. 17, 2017

(54) CAGE FOR A THRUST BEARING HAVING DOUBLE ROWS FOR ROLLER ELEMENTS

(71) Applicant: Schaeffler Technologies AG & Co. KG, Herzogenaurach (DE)

(72) Inventor: Alaa Makke, Farmington Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 23 days.

(21) Appl. No.: 15/092,280

(22) Filed: Apr. 6, 2016

(51) Int. Cl.
*F16C 33/54* (2006.01)
*F16C 33/46* (2006.01)
*F16C 19/30* (2006.01)
*F16C 33/48* (2006.01)

(52) U.S. Cl.
CPC .......... *F16C 33/467* (2013.01); *F16C 19/305* (2013.01); *F16C 33/48* (2013.01)

(58) Field of Classification Search
CPC ...... F16C 19/305; F16C 33/467; F16C 33/48; F16C 33/54; F16C 33/541; F16C 33/542; F16C 33/543; F16C 33/545; F16C 33/546
See application file for complete search history.

(56) References Cited

U.S. PATENT DOCUMENTS

| | | | | |
|---|---|---|---|---|
| 7,114,854 B2 * | 10/2006 | Hayashi | ............... | F16C 19/305 384/623 |
| 7,273,318 B2 * | 9/2007 | Hayashi | .................. | C21D 9/36 384/619 |
| 8,177,438 B2 | 5/2012 | Waseda | | |
| 2006/0088237 A1 | 4/2006 | Yamamoto et al. | | |

FOREIGN PATENT DOCUMENTS

| | | | | |
|---|---|---|---|---|
| JP | 2004156548 A | * | 6/2004 | .......... F04B 27/1063 |
| JP | 2007046644 A | * | 2/2007 | ............. A61C 19/30 |
| JP | 2007046645 A | * | 2/2007 | ............... F16C 19/30 |
| JP | 2007255555 A | * | 10/2007 | ............. F16C 19/541 |

* cited by examiner

*Primary Examiner* — Phillip A Johnson
(74) *Attorney, Agent, or Firm* — Simpson & Simpson, PLLC

(57) ABSTRACT

A cage for a thrust bearing, comprising: a first plurality of circumferentially aligned pockets arranged to accept a first plurality of roller elements; a second plurality of circumferentially aligned pockets located radially inward of the first plurality of pockets and arranged to accept a second plurality of roller elements; a plurality of pairs of circumferentially extending protrusions; and a plurality of openings. Each opening in the plurality of openings: passes through material forming the cage and wholly surrounded by the material forming the cage; and is located between a respective pair of protrusions in a first circumferential direction.

20 Claims, 10 Drawing Sheets

PRIOR
ART

CAGE FOR A THRUST BEARING HAVING DOUBLE ROWS FOR ROLLER ELEMENTS

TECHNICAL FIELD

Disclosed herein is a cage for a thrust bearing having double rows for roller elements, in particular, a cage with radially aligned pairs of pockets separated by a respective space and respective pairs of protrusions. The protrusions are arranged to radially support roller elements while reducing contact area between the cage and the roller elements.

BACKGROUND

FIG. 10 is taken from FIG. 4 of U.S. Pre-grant Publication 2006/0088237 and shows a prior art thrust bearing cage. Thrust bearings having cages with a double row of roller elements are known. It is known to place two radially aligned roller elements in a single pocket for a cage; however, this design results in excessive friction between the roller elements and between the roller elements as the cage. U.S. Pre-grant Publication 2006/0088237 describes thrust bearing cage 200 with one row of pockets 202 and a second row of pockets 204 for receiving roller elements. The two rows of pockets 202 are separated entirely in a circumferential direction by portions 204 of cage 200. Thus, all of tangent width 206 of the ends of roller elements in pockets 202 is in frictional contact with cage 200. Because of this extensive contact between the roller elements and the material forming cage 200, excessive friction is still a problem. U.S. Pat. No. 8,177,483 depicts a complex and costly configuration for a thrust washer with a double row of roller elements.

SUMMARY

According to aspects illustrated herein, there is provided a cage for a thrust bearing, comprising: a first plurality of circumferentially aligned pockets arranged to accept a first plurality of roller elements; a second plurality of circumferentially aligned pockets located radially inward of the first plurality of pockets and arranged to accept a second plurality of roller elements; a plurality of pairs of circumferentially extending protrusions; and a plurality of openings. Each opening in the plurality of openings: passes through material forming the cage and wholly surrounded by the material forming the cage; and is located between a respective pair of protrusions in a first circumferential direction.

According to aspects illustrated herein, there is provided a cage for a thrust bearing, including: a axis of rotation; a first plurality of circumferentially aligned pockets arranged to accept a first plurality of roller elements; a second plurality of circumferentially aligned pockets located radially inward of the first plurality of pockets and arranged to accept a second plurality of roller elements; a plurality of pairs of circumferentially extending protrusions; and a plurality of openings. Each opening in the plurality of openings: passes through material forming the cage and wholly surrounded by the material forming the cage; and is located, in a radial direction orthogonal to the axis of rotation, between a respective pocket included in the first plurality of pockets and a respective pocket included in the second plurality of pockets.

According to aspects illustrated herein, there is provided a cage for a thrust bearing, including: an axis of rotation; a first plurality of circumferentially aligned pockets arranged to accept a first plurality of roller elements; a second plurality of circumferentially aligned pockets located radially inward of the first plurality of pockets and arranged to accept a second plurality of roller elements; a plurality of pairs of circumferentially extending protrusions; and a plurality of openings Each opening in the plurality of openings: passing through material forming the cage and wholly surrounded by the material forming the cage; located between a respective pair of protrusions in a first circumferential direction; and located, in a radial direction orthogonal to the axis of rotation, between a respective pocket included in the first plurality of pockets and a respective pocket included in the second plurality of pockets.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

Figure 1:
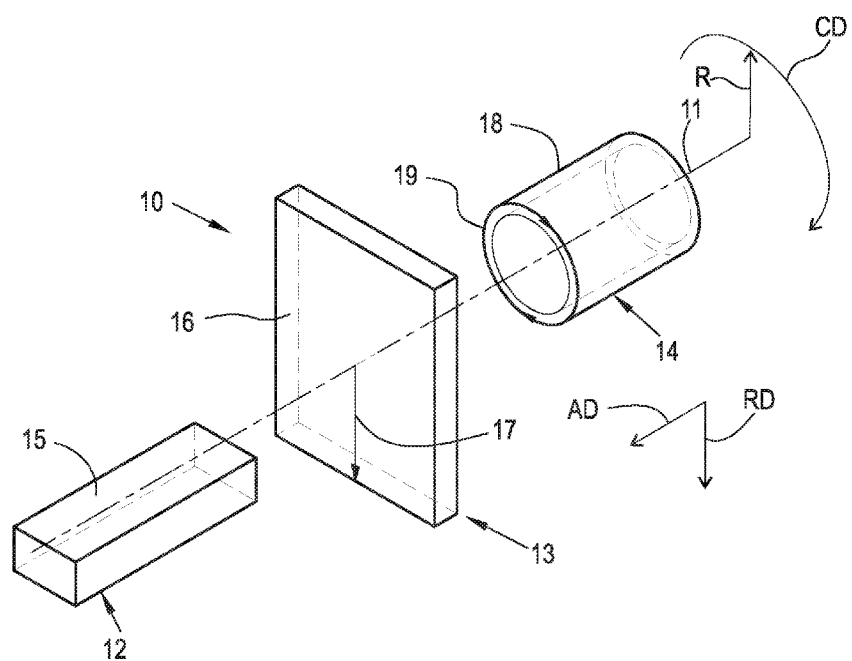
FIG. 1 is a perspective view of a cylindrical coordinate system demonstrating spatial terminology used in the present patent; and, FIG. 2 is a back perspective view of a cage for a thrust bearing with double rows for roller elements.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" components we mean that the components are connected so that any time any of the components rotate, all the components rotate. Relative rotation is not possible between non-rotatably connected components. Axial displacement between non-rotatably connected components is possible, but not required.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

In the discussion that follows, three digit numbers are used to identify portions of cage 100 for a thrust bearing with double rows for roller elements. These three digit number represent the general representation of the respective portion. Capital letters are appended to respective three digit numbers to identify specific examples of the respective portions.

Figure 2:
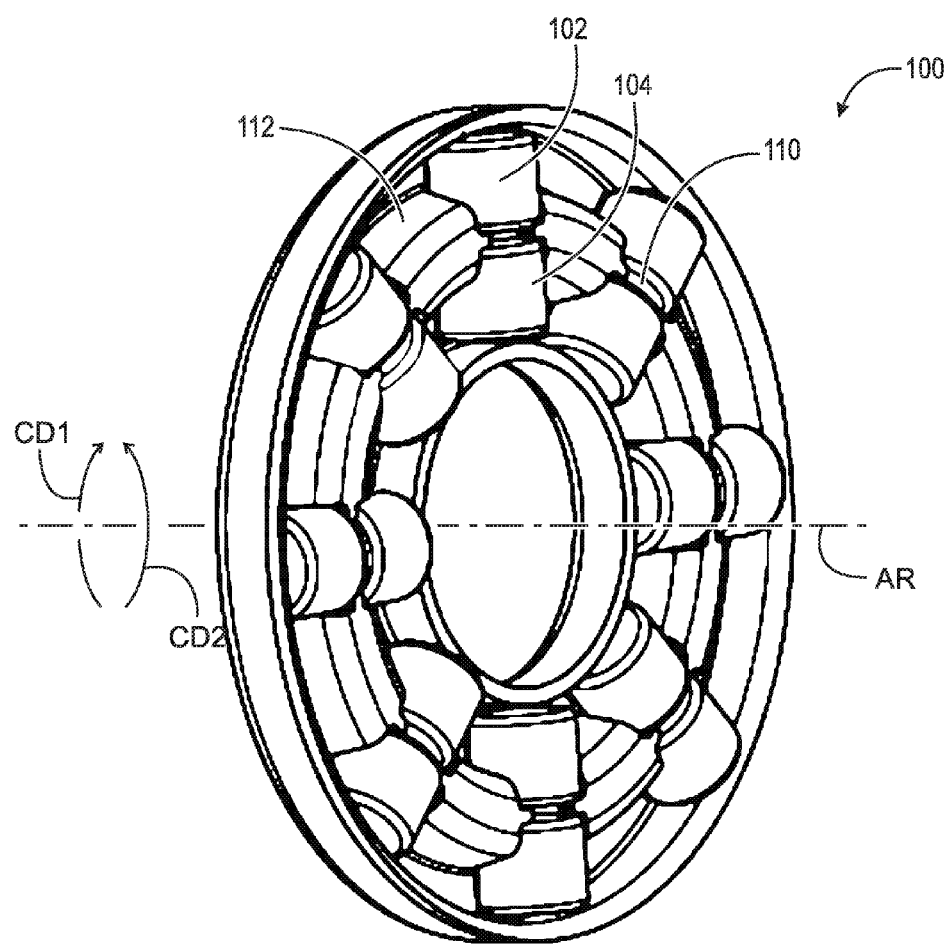

FIG. 2 is a back perspective view of cage 100 for a thrust bearing with double rows for roller elements.

Figure 3:
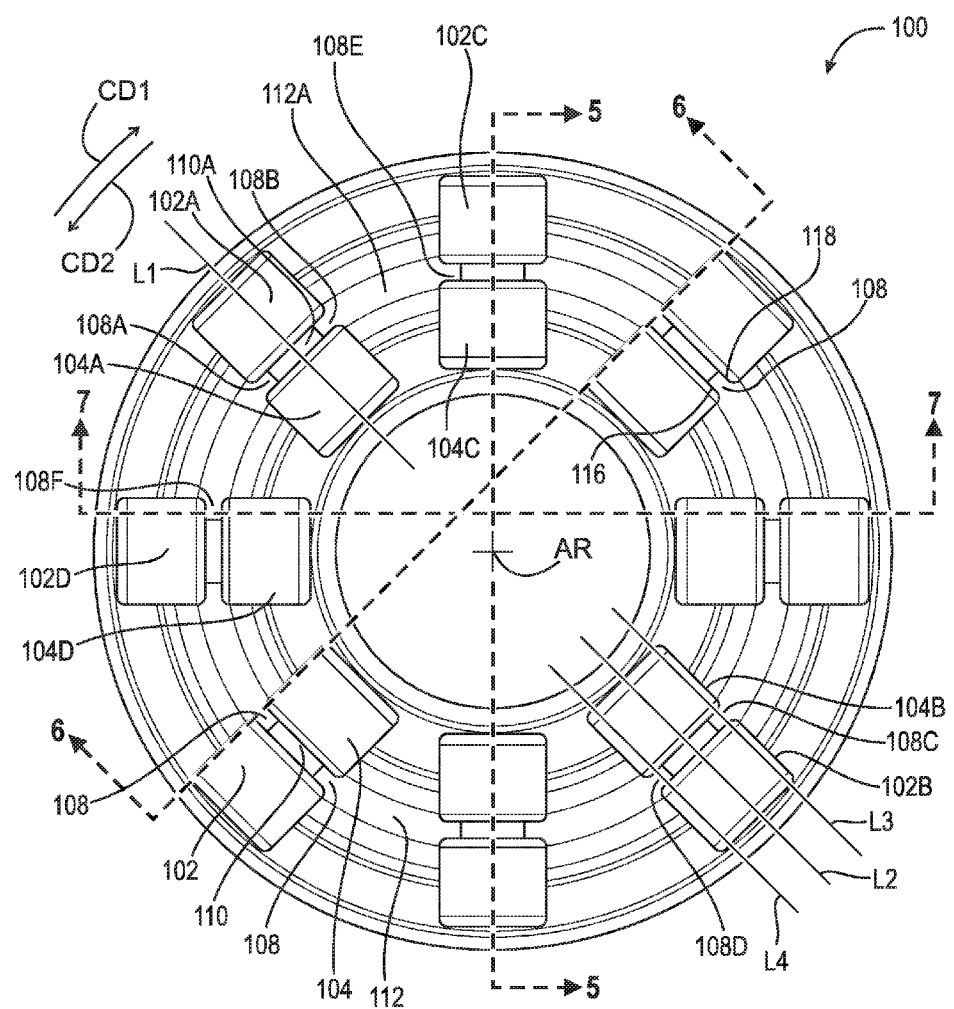
FIG. 3 is a back view of the cage in FIG. 2.

FIG. 3 is a back view of cage 100 in FIG. 2

Figure 4:
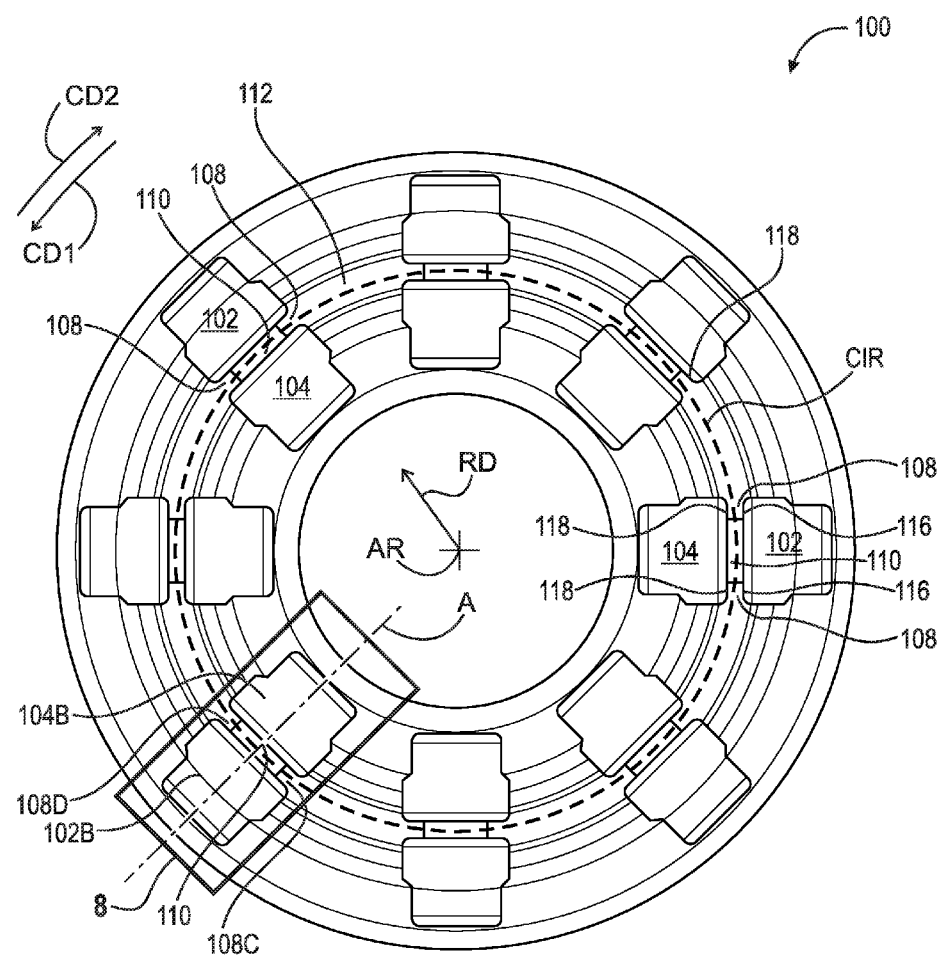
FIG. 4 is a front view of the cage in FIG. 2.

FIG. 4 is a front view of cage 100 in FIG. 2. The following should be viewed in light of FIGS. 2 through 4. Cage 100 includes axis of rotation AR, circumferentially aligned pockets 102, circumferentially aligned pockets 104, pairs of protrusions 108, and openings 110. Pockets 102 are arranged to receive roller elements (shown below). Pockets 104 are located radially inward of pockets 102 and are arranged to accept roller elements (shown below). Each opening 110 passes through material forming cage 100 and is wholly surrounded by the material forming cage 100. Each opening 110 is located between a respective pair of protrusions 108 in circumferential direction CD1. For example, opening 110A is located between protrusions 108A and 108B in direction CD1.

Each opening 110 is located, in radial direction RD, between a respective pocket 102 and a respective pocket 104. For example, opening 110A is located between pockets 102A and 104A in direction RD. For example, line L1, in direction RD, passes through opening 110A, pocket 102A and pocket 104A.

In an example embodiment: line L2, bisects respective pockets 102 and 104; line L3, parallel to line L2, passes through respective pockets 102 and 104 and one protrusion 108 between the respective pockets; and line L4, parallel to line L2, passes through the respective pockets 102 and 104 and another protrusion 108 between the respective pockets. For example, line L2 bisects pockets 102B and 104B. Line L3 passes through pockets 102B and 104B and protrusion 108C; and line L4 passes through pockets 102B and 104B and protrusion 108D.

In an example embodiment, cage 100 includes pockets 112. Each pocket 112 is circumferentially disposed between a pair of circumferentially adjacent pockets 102 or between a pair of circumferentially adjacent pockets 104. For example, pocket 112A is circumferentially disposed between: pockets 102A and 102C and pockets 104A and 104C. In an example embodiment, each pocket 112 is in contact with a pair of circumferentially adjacent pockets 102 or with a pair of circumferentially adjacent pockets 104. For example, pocket 112A is in contact with: pockets 102A and 102C and pockets 104A and 104C.

In an example embodiment, for each pocket 112: a protrusion 108 extends from the pocket 112 in circumferential direction CD1; and another protrusion 108 extends from the pocket 112 in circumferential direction CD2, opposite circumferential direction CD1. For example, for pocket 112A: protrusion 108E extends from pocket 112A in circumferential direction CD1; and protrusion 108B extends from the pocket 112A in circumferential direction CD2. In an example embodiment, each pocket 112 is circumferentially disposed between a respective pair of circumferentially adjacent openings 110.

Figure 5:
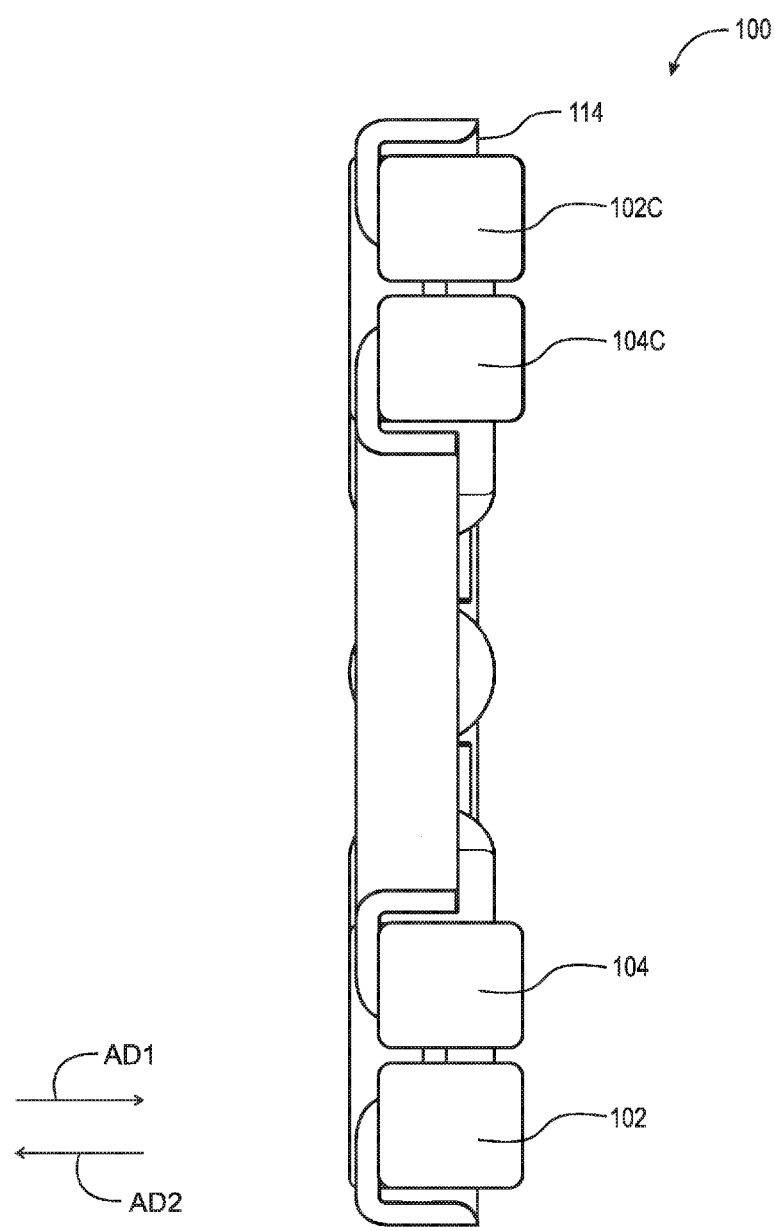
FIG. 5 is a cross-sectional view generally along line 5-5 in FIG. 3.

FIG. 5 is a cross-sectional view generally along line 5-5 in FIG. 3.

Figure 6:
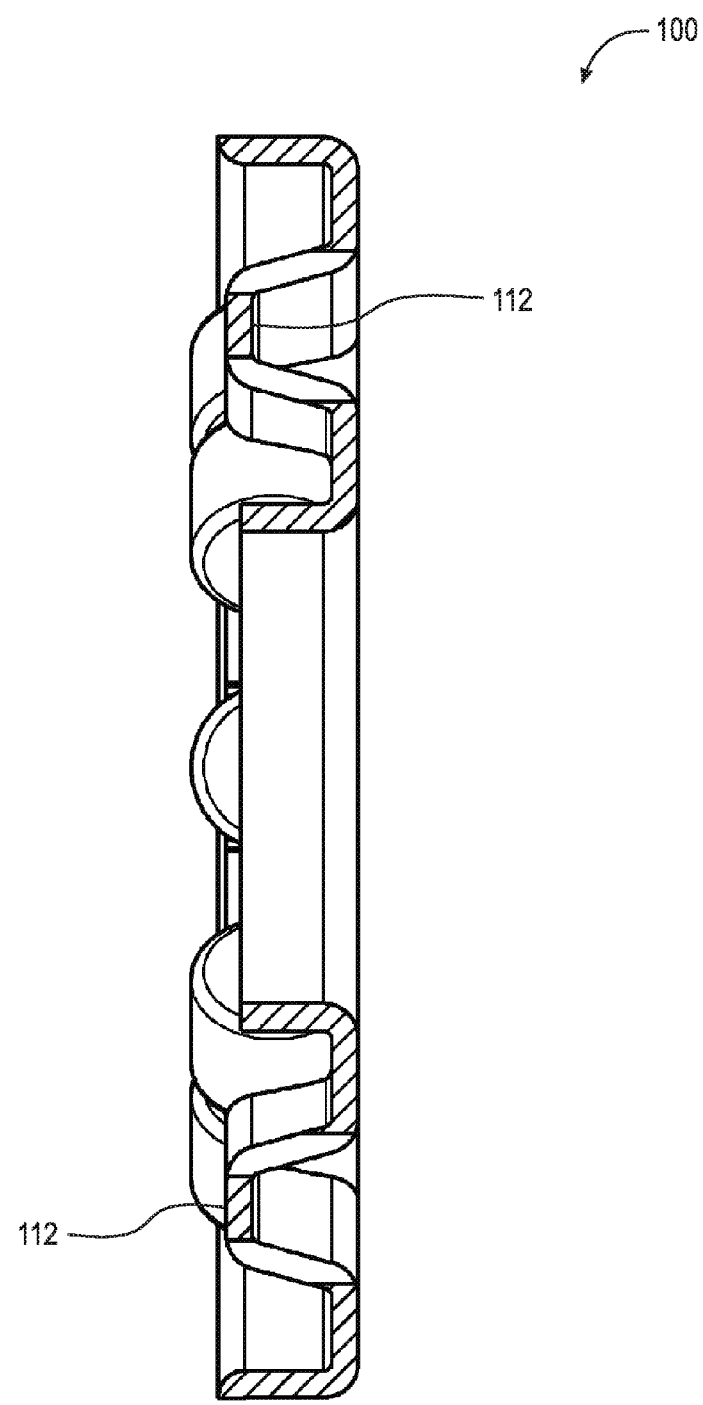
FIG. 6 is a cross-sectional view generally along line 6-6 in FIG. 3.

FIG. 6 is a cross-sectional view generally along line 6-6 in FIG. 3. The following should be viewed in light of FIGS. 2 through 6. In an example embodiment, circle CIR, with a center point included in axis of rotation AR, passes openings 110 and protrusions 108 without passing through pockets 102. Cage 100 includes axial end 114 facing in axial direction AD1 and forming a portion of cage 100 extending furthest in axial direction AD1. Pockets 102 and 104 extend from axial end 114 in axial direction AD2 opposite axial direction AD1. In an example embodiment, pockets 102 and 104 extend further in axial direction AD2 than protrusions 108.

Figure 7:
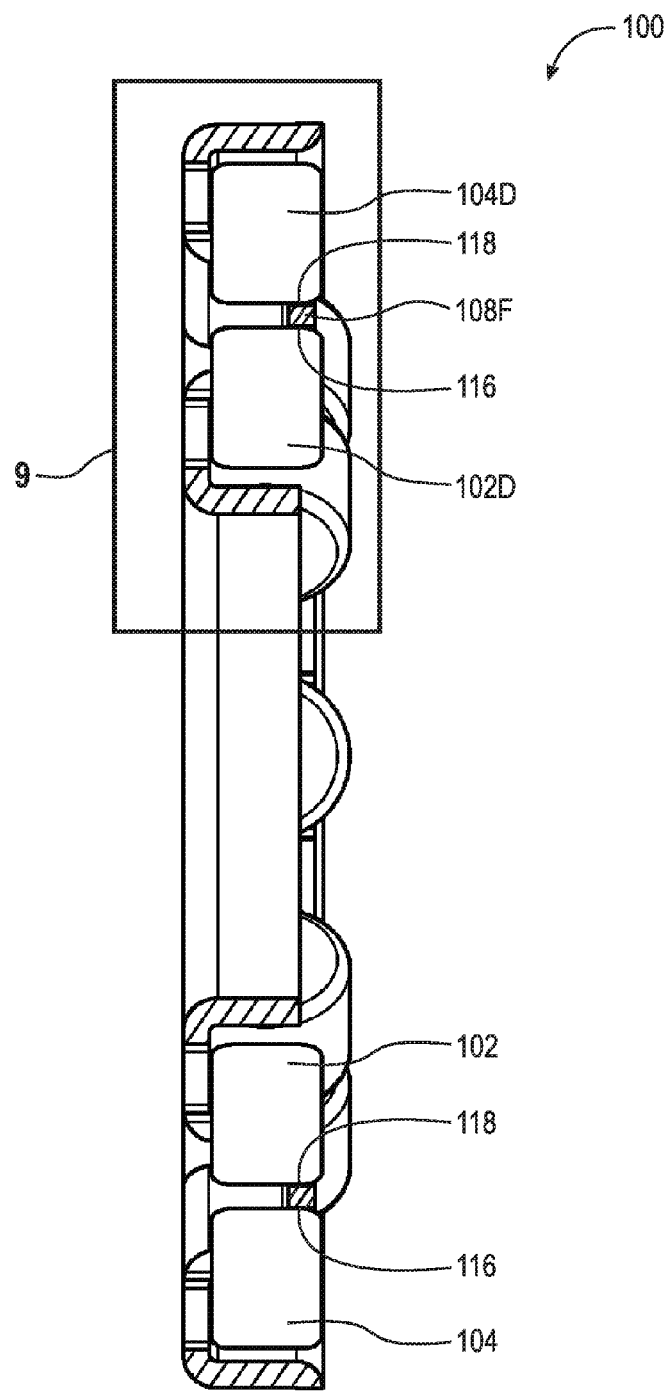
FIG. 7 is a cross-sectional view generally along line 7-7 in FIG. 3.

FIG. 7 is a cross-sectional view generally along line 7-7 in FIG. 3. The following should be viewed in light of FIGS. 2 through 7. Each protrusion 108 includes inner circumferential surface 116 and outer circumferential surface 118. As described below, roller elements are arranged to contact surfaces 116 and 118. It should be understood that protrusions 108 are not limited to a particular shape in a radial cross-section.

Figure 8:
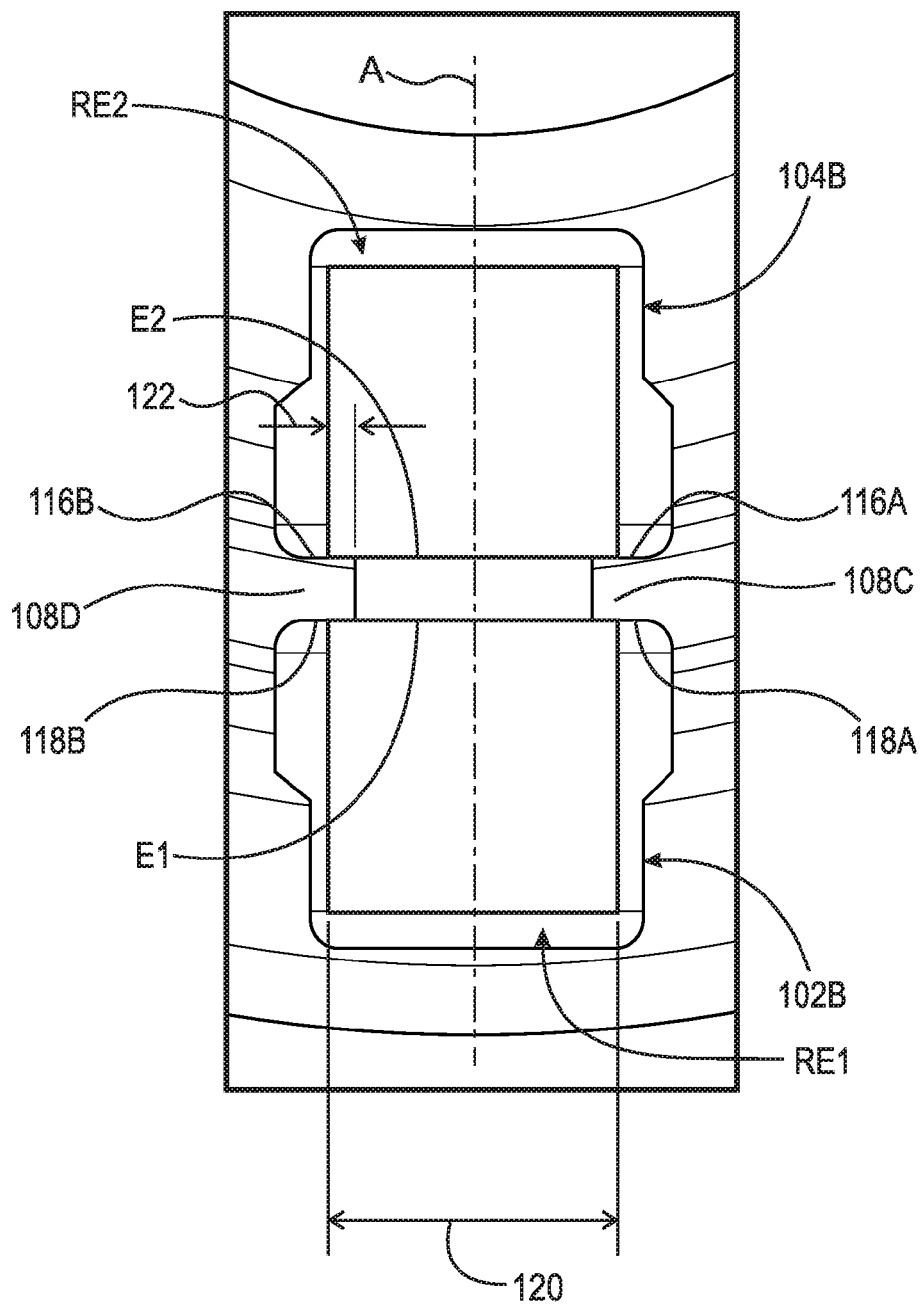
FIG. 8 is a detail of area 8 in FIG. 4 with roller elements.

FIG. 8 is a detail of area 8 in FIG. 4 with roller elements. The following should be viewed in light of FIGS. 2 through 8. Each pocket 102 and 104 is arranged to receive a respective rolling element. For example, pocket 102B is shown with roller element RE1 and pocket 104B is shown with roller element RE2. Axis of rotation A for roller elements in cage 100, for example elements RE1 and RE2, passes through axis of rotation AR and longitudinal ends E1 and E2 of elements RE1 and RE2, respectively. Longitudinal ends E1 and E2 face each other in radial directions. Protrusions 108C and 108D are arranged to contact longitudinal ends E1 and E2. For example surfaces 116A and 118A of protrusion 108C and surfaces 116B and 118B of protrusion 108D contact ends E1 and E2. In an example embodiment, the only portion of cage 100 to contact longitudinal ends E1 and E2 is protrusions 108C and 108D. Thus, only a portion of tangent width 120 of roller elements in cage 100 is in contact with cage 100 at protrusions 108.

Figure 9:
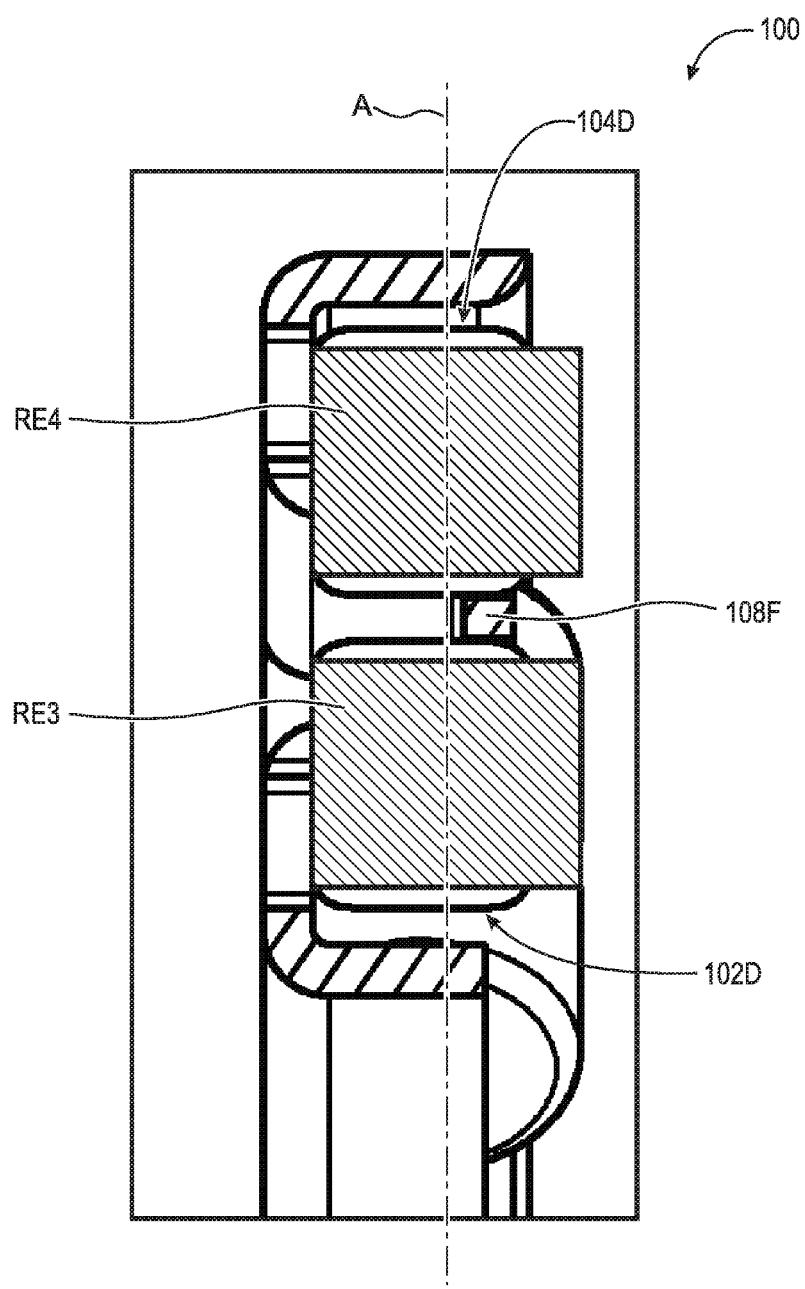
FIG. 9 is a detail of area 9 in FIG. 7 with roller elements.
Figure 10:
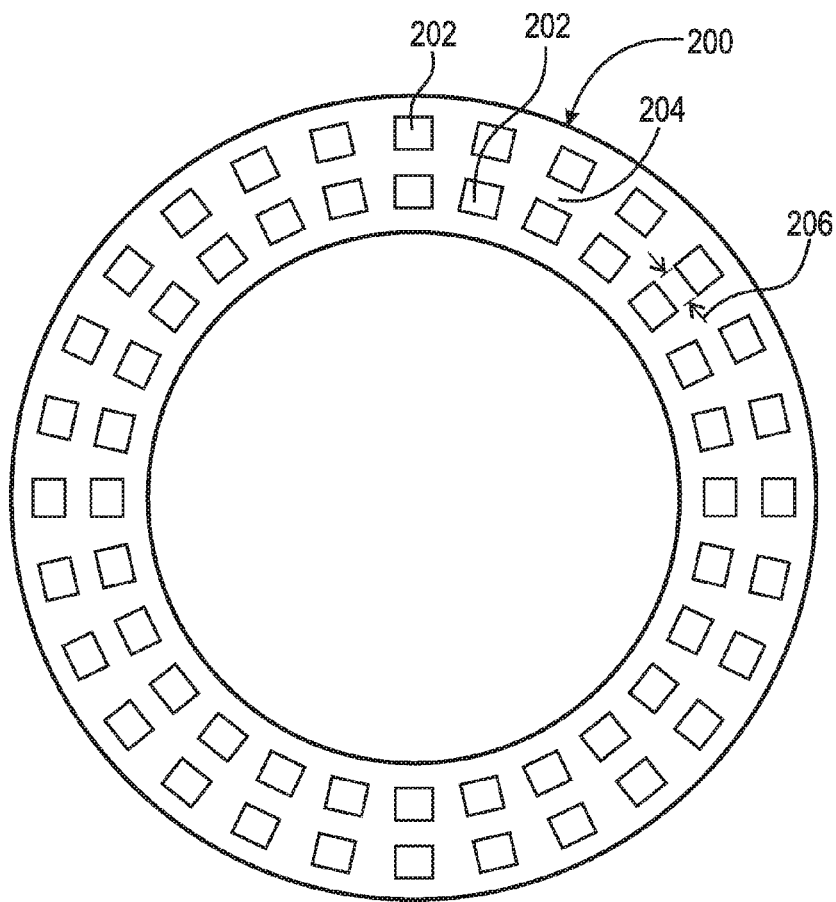
FIG. 10 is taken from FIG. 4 of U.S. Pre-grant Publication 2006/0088237 and shows a prior art thrust bearing cage.

FIG. 9 is a detail of area 9 in FIG. 7 with roller elements. The following should be viewed in light of FIGS. 2 through 9. In an example embodiment, axis of rotation A for roller elements in cage 100 do not pass through protrusions 108, for example, axis A does not pass through elements RE3 and RE4 and protrusion 108F in FIG. 9.

Advantageously, cage 100 greatly reduces the friction associated with operation of roller elements in cage 100. In particular, cage 100 reduces the contact area between roller elements and cage 100. For example, contact between roller elements RE1 and RE2 is limited to protrusions 108, in particular surfaces 116 and 118. The contact area between roller elements RE1 and RE2 and surfaces 116 and 118 is much less than the contact area, taught in the prior art, between roller elements and a cage for a thrust bearing. For example, only portion 120 of width 120 is in contact with the cage and protrusions 108.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A cage for a thrust bearing, comprising:
   a first plurality of circumferentially aligned pockets arranged to accept a first plurality of roller elements;
   a second plurality of circumferentially aligned pockets:
      located radially outward of the first plurality of pockets; and,
      arranged to accept a second plurality of roller elements;
   a plurality of pairs of circumferentially extending protrusions; and,
   a plurality of openings, each opening in the plurality of openings:
      passing through material forming the cage and wholly surrounded by the material forming the cage; and,
      located between a respective pair of protrusions in a first circumferential direction.

2. The cage recited in claim 1, wherein said each opening is located, in a radial direction, between a respective pocket included in the first plurality of pockets and a respective pocket included in the second plurality of pockets.

3. The cage recited in claim 1, further comprising:
   an axis of rotation, wherein:
      a first line, orthogonal to the axis of rotation bisects first and second pockets included in the first and second pluralities of pockets, respectively; and,
      a second line, parallel to the first line, passes through the first and second pockets and a first protrusion included in a respective pair of protrusions; and,
      a third line, parallel to the first line, passes through the first and second pockets and a second protrusion included in the respective pair of protrusions.

4. The cage recited in claim 1, further comprising:
   a third plurality of pockets, wherein each pocket in the third plurality of pockets is circumferentially disposed between a respective pair of circumferentially adjacent pockets included in the first plurality of pockets.

5. The cage recited in claim 1, further comprising:
   a third plurality of pockets, wherein each pocket in the third plurality of pockets is circumferentially disposed between a respective pair of circumferentially adjacent pockets included in the second plurality of pockets.

6. The cage recited in claim 1, further comprising:
   a third plurality of pockets, wherein for each pocket included in the third plurality of pockets:
      a protrusion from a first respective pair of protrusions extends from said each pocket in the first circumferential direction; and,
      a protrusion from a second respective pair of protrusions extends from said each pocket in a second circumferential direction, opposite the first circumferential direction.

7. The cage recited in claim 1, further comprising:
   a third plurality of pockets, wherein each pocket in the third plurality of pockets is in contact with:
      a respective pair of circumferentially adjacent pockets included in the first plurality of pockets; and,
      a respective pair of circumferentially adjacent pockets included in the second plurality of pockets.

8. The cage recited in claim 1, further comprising:
   a third plurality of pockets, wherein each pocket in the third plurality of pockets is circumferentially disposed between a respective pair of circumferentially adjacent openings included in the plurality of openings.

9. The cage recited in claim 1, further comprising:
   an axis of rotation, wherein a respective line orthogonal to the axis of rotation passes through:
      each respective opening; and,
      respective first and second pockets included in the first and second pluralities of pockets, respectively.

10. The cage recited in claim 1, further comprising:
    an axis of rotation, wherein a circle with a center point included in the axis of rotation passes through the plurality of openings and the plurality of protrusions without passing through the second pluralities of pockets.

11. The cage recited in claim 1, further comprising:
    an axis of rotation;
    a first axial end facing in a first axial direction and forming a portion of the cage extending furthest in the first axial direction, wherein the pockets extend from the first axial end in a second axial direction opposite the first axial direction.

12. The cage recited in claim 11, wherein the first and second pluralities of pockets extend further in the second axial direction than the plurality of protrusions.

13. The cage recited in claim 1, further comprising:
    an axis of rotation, wherein:
       a first pocket included in the first plurality of pockets is arranged to accept a first roller included in the first plurality of rollers;
       a second pocket included in the second plurality of pockets is arranged to accept a second roller included in the second plurality of rollers;
       an axis of rotation for the first and second rollers is formed by a line orthogonal to the axis of rotation and passes through first and second longitudinal ends of the first and second rollers, respectively;
       the first and second longitudinal ends face each other; and,
       the respective pair of protrusions between the first and second pockets are arranged to engage the first and second longitudinal ends.

14. A cage for a thrust bearing, comprising:
    a axis of rotation;
    a first plurality of circumferentially aligned pockets arranged to accept a first plurality of roller elements;
    a second plurality of circumferentially aligned pockets:
       located radially outward of the first plurality of pockets; and,
       arranged to accept a second plurality of roller elements;
    a plurality of pairs of circumferentially extending protrusions; and, a plurality of openings, each opening in the plurality of openings:
  passing through material forming the cage and wholly surrounded by the material forming the cage; and,
  located, in a radial direction orthogonal to the axis of rotation, between a respective pocket included in the first plurality of pockets and a respective pocket included in the second plurality of pockets.

15. The cage recited in claim 14, wherein said each opening is located between a respective pair of protrusions in a first circumferential direction.

16. The cage recited in claim 14 wherein:
a first line, orthogonal to the axis of rotation bisects first and second pockets included in the first and second pluralities of pockets, respectively; and,
a second line, parallel to the first line, passes through the first and second pockets and a first protrusion included in a respective pair of protrusions; and,
a third line, parallel to the first line, passes through the first and second pockets and a second protrusion included in the respective pair of protrusions.

17. The cage recited in claim 14, further comprising:
a third plurality of pockets, wherein for each pocket included in the third plurality of pockets:
  a protrusion from a first respective pair of protrusions extends from said each pocket in the first circumferential direction; and,
  a protrusion from a second respective pair of protrusions extends from said each pocket in a second circumferential direction, opposite the first circumferential direction.

18. The cage recited in claim 14, further comprising:
a third plurality of pockets, wherein each pocket in the third plurality of pockets is circumferentially disposed between a respective pair of circumferentially adjacent openings included in the plurality of openings.

19. The cage recited in claim 14, wherein:
a first pocket included in the first plurality of pockets is arranged to accept a first roller included in the first plurality of rollers;
a second pocket included in the second plurality of pockets is arranged to accept a second roller included in the second plurality of rollers;
an axis of rotation for the first and second rollers is formed by a line orthogonal to the axis of rotation and passes through first and second longitudinal ends of the first and second rollers, respectively;
the first and second longitudinal ends face each other; and,
the respective pair of protrusions between the first and second pockets are arranged to engage the first and second longitudinal ends.

20. A cage for a thrust bearing, comprising:
a axis of rotation;
a first plurality of circumferentially aligned pockets arranged to accept a first plurality of roller elements;
a second plurality of circumferentially aligned pockets:
  located radially outward of the first plurality of pockets; and,
  arranged to accept a second plurality of roller elements;
a plurality of pairs of circumferentially extending protrusions; and,
a plurality of openings, each opening in the plurality of openings:
  passing through material forming the cage and wholly surrounded by the material forming the cage;
  located between a respective pair of protrusions in a first circumferential direction; and,
  located, in a radial direction orthogonal to the axis of rotation, between a respective pocket included in the first plurality of pockets and a respective pocket included in the second plurality of pockets.

* * * * *